United States Patent
Wong et al.

(10) Patent No.: US 9,205,633 B2
(45) Date of Patent: Dec. 8, 2015

(54) PREPREG CURING PROCESS FOR PREPARING COMPOSITES HAVING SUPERIOR SURFACE FINISH AND HIGH FIBER CONSOLIDATION

(71) Applicant: Henkel Corporation, Rocky Hill, CT (US)

(72) Inventors: Raymond S. Wong, San Ramon, CA (US); Wei Helen Li, Danville, CA (US); Huabing Zheng, Concord, CA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 153 days.

(21) Appl. No.: 13/833,425

(22) Filed: Mar. 15, 2013

(65) Prior Publication Data

US 2014/0262014 A1  Sep. 18, 2014

(51) Int. Cl.
*B32B 37/06* (2006.01)
*B32B 37/10* (2006.01)
*B29C 70/44* (2006.01)
*B29C 71/02* (2006.01)
*B29C 35/02* (2006.01)
*B29C 37/00* (2006.01)

(52) U.S. Cl.
CPC .............. *B32B 37/06* (2013.01); *B29C 35/02* (2013.01); *B29C 37/005* (2013.01); *B29C 37/0064* (2013.01); *B29C 70/44* (2013.01); *B29C 71/02* (2013.01); *B32B 37/1018* (2013.01); *B29C 2071/022* (2013.01)

(58) Field of Classification Search
CPC .... B32B 37/06; B32B 37/1018; B29C 70/44; B29C 2071/022; B29C 35/02; B29C 37/005; B29C 37/0064; B29C 71/02
See application file for complete search history.

(56) References Cited

U.S. PATENT DOCUMENTS

| | | |
|---|---|---|
| 4,357,193 A | 11/1982 | McGann et al. |
| H559 H | 12/1988 | Brown |
| 6,521,296 B1 | 2/2003 | Seal et al. |
| 7,527,757 B2 | 5/2009 | Chevin et al. |
| 2010/0196729 A1 | 8/2010 | Whiteker et al. |
| 2010/0285243 A1* | 11/2010 | Kim et al. ............... 428/1.1 |

* cited by examiner

*Primary Examiner* — Kriellion Sanders
(74) *Attorney, Agent, or Firm* — Steven C. Bauman

(57) ABSTRACT

A prepreg curing process for preparing composites having superior surface finish and high fiber consolidation is provided.

20 Claims, No Drawings

PREPREG CURING PROCESS FOR PREPARING COMPOSITES HAVING SUPERIOR SURFACE FINISH AND HIGH FIBER CONSOLIDATION

BACKGROUND

1. Field

A prepreg curing process for preparing composites having superior surface finish and high fiber consolidation is provided.

2. Brief Description of Related Technology

Prepreg curing is ordinarily conducted in an autoclave in which elevated temperature and pressure conditions are used to create composites having relatively smooth surface finishes.

This technique is satisfactory. However, when large parts are to be formed, large autoclaves are required to create the composite. Autoclave processing is very expensive from an equipment and processing standpoint. Consequently, parts are frequently not made from prepreg or if they are they are made by a select few companies, which have invested in that equipment.

In order to expand the reach of prepreg technology into large part manufacturing, a solution is needed. The present invention provides that.

SUMMARY

A process is provided for curing a prepreg, comprising the steps of

Providing a prepreg comprising a thermosetting resin composition and fiber;

Placing the prepreg under reduced pressure;

Exposing the prepreg under reduced pressure to a first elevated temperature for a time sufficient to:

remove about 1% by weight to about 3% by weight volatile materials in the prepreg, based on the total weight of the prepreg and increase viscosity of the prepreg to a range of about 1 to about 40,000 Poise;

Optionally, exposing the prepreg under reduced pressure to a second elevated temperature for a time sufficient to remove any remaining volatile materials in the prepreg;

Exposing the prepreg under reduced pressure to a third elevated temperature for a time sufficient to cure the prepreg; and Exposing the cured prepreg to a fourth elevated temperature condition that is less than any one of the first, second or third elevated temperature conditions with or without reduced pressure.

Desirably, the first elevated temperature is in the range of about 120° F. to about 350° F.

Desirably, the second elevated temperature is greater than the first elevated temperature.

Desirably, the third elevated temperature is greater than the first and/or second elevated temperature.

Desirably, the fourth elevated temperature is less than the first and/or second and/or third elevated temperature.

Of course, cured prepregs so made are also provided.

The present invention will be more fully understood by a reading of the following detailed description of the invention.

DETAILED DESCRIPTION

As noted above, a process is provided for curing a prepreg, comprising the steps of Providing a prepreg comprising a thermosetting resin composition and fiber;

Placing the prepreg under reduced pressure

Exposing the prepreg under reduced pressure to a first elevated temperature for a time sufficient to:

remove about 1% by weight to about 3% by weight volatile materials in the prepreg, based on the total weight of the prepreg and increase viscosity of the prepreg to a range of about 1 to about 40,000 Poise;

Optionally, exposing the prepreg under reduced pressure to a second elevated temperature for a time sufficient to remove any remaining volatile materials in the prepreg;

Exposing the prepreg under reduced pressure to a third elevated temperature for a time sufficient to cure the prepreg; and Exposing the cured prepreg to a fourth elevated temperature condition that is less than any one or more of the first, second or third elevated temperature conditions with or without reduced pressure.

Desirably, the reduced pressure is greater than 258 mm Hg (5 psi), desirably greater than 517 mm Hg (10 psi), such as greater than 686 mm Hg (13.3 psi).

Desirably, the first elevated temperature is in the range of about 120° F. to about 350° F., such as about 200° F. The time here should be about 2 hours.

Desirably, the second elevated temperature is about 290° F. and the time is about 3 hours.

Desirably, the third elevated temperature is greater than the first and/or second elevated temperature, and should be about 360° F. The time here should be about 2 hours.

Desirably, the fourth elevated temperature is less than the first and/or second and/or third elevated temperature, and should be about 90° F. with or without reduced pressure.

In a similar manner to the prepregging processes, towpregging processes are also provided.

In the practice of the inventive processes consolidation is enhanced, the effects of cure shrinkage are reduced, cure stress is reduced, surface imperfections and void volume are reduced, and fiber volume and resin/fiber wetting are increased.

Consolidation and shrinkage due to cure of the thermosetting resin composition are issues for composite or laminate formation. Consolidation pressure is ordinarily provided by autoclave or a press, with pressures reaching in the range of up to 100 psi. Even when such external pressure is increased beyond 100 psi, the resin may not see such pressure as the fibers begin to bear the load. And resin fluid pressure can further reduce as the resin cures and begins to shrink. In building a large composite part where a temperature gradient exists at various locations within the part, low fluid pressure at and/or during cure can occur at the temperature lagging areas, resulting in poor wetting and poor composite properties.

In addition, when thermosetting resin compositions are used as matrix resins, which have low viscosity and high volatility, resin volatilization may create imperfection/microvoids in the composite or laminate, for instance, from entrapped air, water and other low boiling materials.

Prepregs formed from fibers, which may be laid up in a layer format, and infused with the thermosetting resin composition according to the inventive processes are also provided.

The fiber may be constructed from unidirectional fibers, woven fibers, chopped fibers, non-woven fibers or long, discontinuous fibers.

The fiber chosen may be selected from carbon, glass, aramid, boron, polyalkylene, quartz, polybenzimidazole, polyetheretherketone, polyphenylene sulfide, poly p-phenylene benzobisoaxazole, silicon carbide, poly p-phenylene benzobisthiazole, phenolformaldehyde, phthalate, poly pyridobisimidazole and napthenoate.

The carbon is selected from polyacrylonitrile, pitch, rayon and acrylic, and the glass is selected from S glass, S2 glass, E glass, R glass, A glass, AR glass, C glass, D glass, ECR glass, glass filament, staple glass, T glass and zirconium oxide glass.

The thermosetting resin composition should have a viscosity in the range of 100 to 40,000 cps at an impregnation temperature of 140° F. to 300° F. In addition, the time within which the viscosity of the thermosetting resin composition increases by 100% under the process conditions is in the range of 10 minutes to 10 hours.

The thermosetting resin composition may include oxazine, oxazoline, epoxy, episulfide, cyanate ester, maleimide, nadimide, itaconimide, phenolic, thiophenolic and combinations thereof.

Where the thermosetting resin composition includes as at least a portion thereof an oxazine component, the oxazine component may be embraced by the following structure:

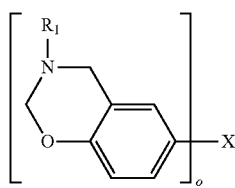

I where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is selected from hydrogen, alkyl and aryl.

More specifically, the oxazine may be embraced by the following structure:

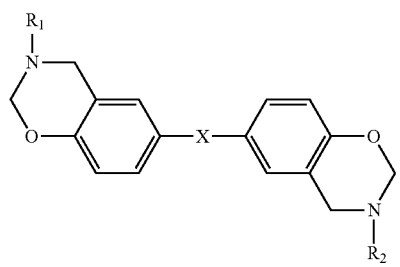

II where X is selected from of a direct bond, $CH_2$, $C(CH_3)_2$, C=O, S, S=O and O=S=O, and $R_1$ and $R_2$ are the same or different and are selected from hydrogen, alkyl, such as methyl, ethyl, propyls and butyls, and aryl.

The oxazine thus may be selected from any of the following exemplified structures:

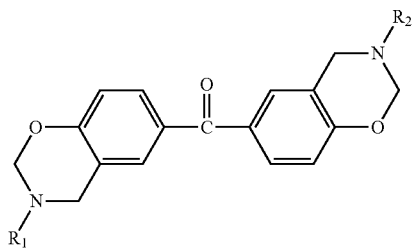

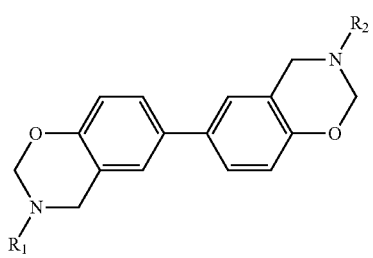

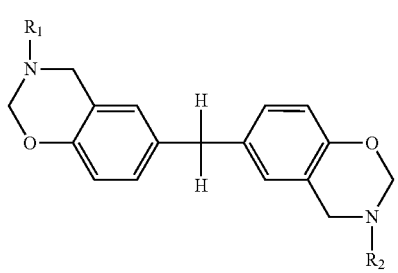

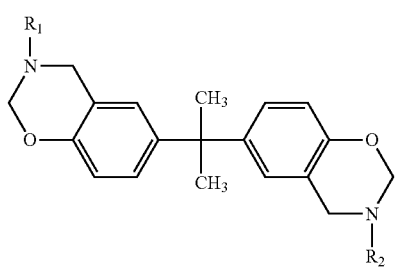

where $R_1$ and $R_2$ are as defined above.

Though not embraced by either of oxazine structures I or II additional oxazines may be embraced by the following structures:

III

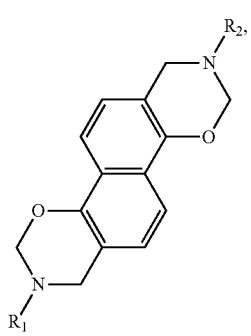

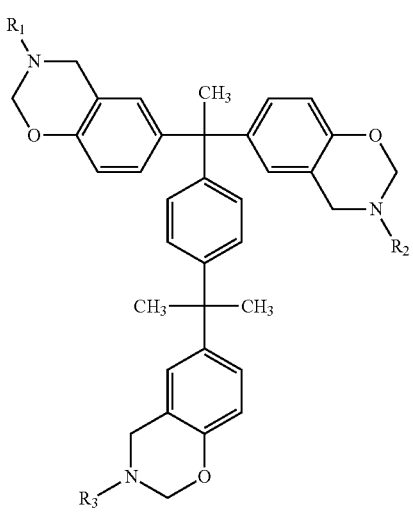

IV

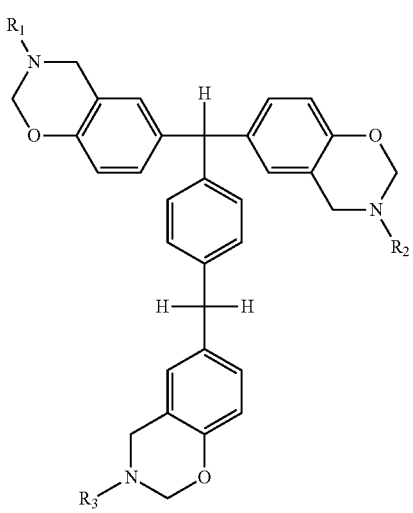

V

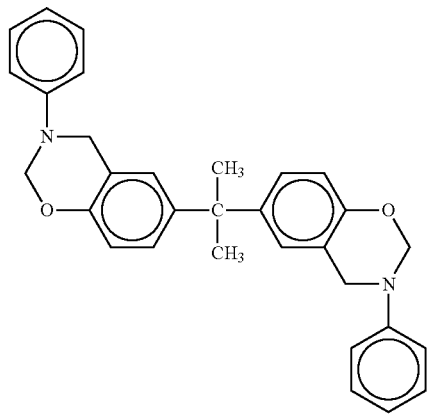

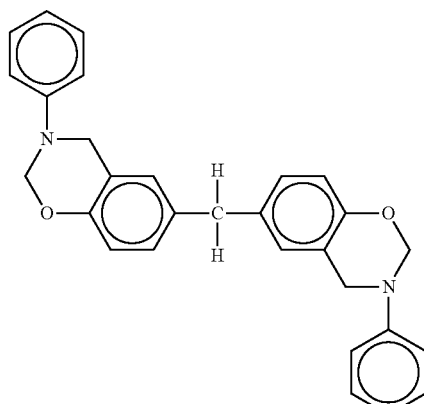

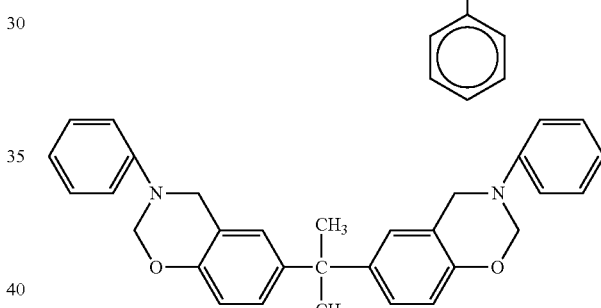

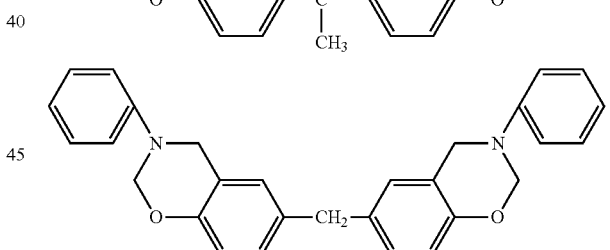

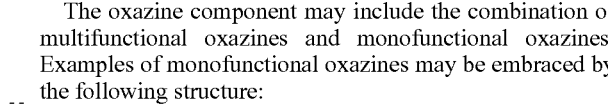

where $R_1$ are $R_2$ are as defined above, and $R_3$ is defined as $R_1$ or $R_2$.

Specific examples of these oxazines therefore include:

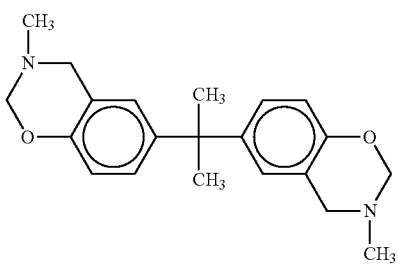

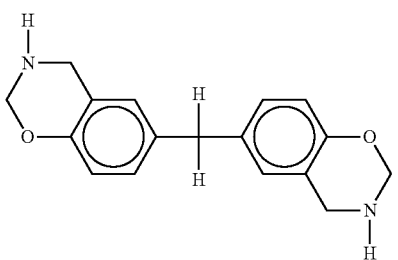

The oxazine component may include the combination of multifunctional oxazines and monofunctional oxazines. Examples of monofunctional oxazines may be embraced by the following structure:

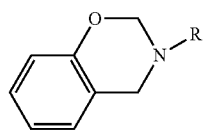

where R is aryl or alkyl, such as methyl, ethyl, propyls and butyls.

As the oxazoline, compounds embraced by the following structure are suitable,

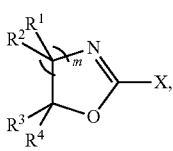

where $R^1$, $R^2$, $R^3$, $R^4$ and X are hydrogen or as regards x a direct bond to a divalent organic radical, and m is 1 or 2.

Exemplary oxazoline compounds may have the structure

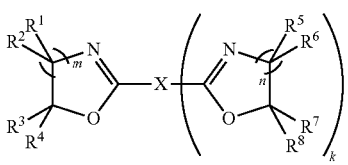

in which k is 0-6; m and n are each independently 1 or 2 provided that at least one of m or n is 1; X is a monovalent or polyvalent radical selected from branched chain alkyl, alkylene, alkylene oxide, ester, amide, carbamate and urethane species or linkages, having from about 12 to about 500 carbon atoms; and $R^1$ to $R^8$ are each independently selected from $C_{1-40}$ alkyl, $C_{2-40}$ alkenyl, each of which being optionally substituted or interrupted by one or more —O—, —NH—, —S—, —CO—, —C(O)O—, —NHC(O)—, and $C_{6-20}$ aryl groups.

The oxazoline compounds include 4,4',5,5'-tetrahydro-2,2'-bis-oxazole, 2,2'-bis(2-oxazoline); a 2,2'-(alkanediyl)bis[4,4-dihydrooxazole], e.g., 2,2'-(2,4-butanediyl)bis[4,5-dihydrooxazole] and 2,2'-(1,2-ethanediyl)bis[4,5-dihydrooxazole]; a 2,2'-(arylene)bis[4,5-dihydrooxazole]; e.g., 2,2'-(1,4-phenylene)bis(4,5-dihydrooxazole], 2,2'-(1,5-naphthalenyl)bis(4,5-dihydrooxazole], 2,2'-(1,3-phenylene) bis[4,5-dihydrooxazole), and 2,2'-(1,8-anthracenyl)bis[4,5-dihydrooxazole; a sulfonyl, oxy, thio or alkylene bis 2-(arylene) [4,5-dihydrooxazole, e.g., sulfonyl bis 2-(1,4-phenylene) [4,5-dihydrooxazole], thio bis 2,2'-(1,4-phenylene) [4,5-dihydrooxazole] and methylene bis 2,2'-(1,4-phenylene) [4,5-dihydrooxazole]; a 2,2',2"-(1,3,5-arylene) tris[4,5-dihydrooxazole], e.g., 2,2',2"-tris(4,5-dihydrooxazole]1,3,5-benzene; a poly[(2-alkenyl) 4,5-hydrooxazole], e.g., poly[2-(2-propenyl) 4,5-dihydrooxazole], and of course combinations thereof.

The oxazoline compounds may have any one or more of the following structures:

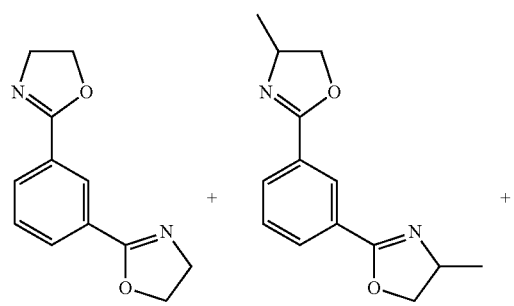

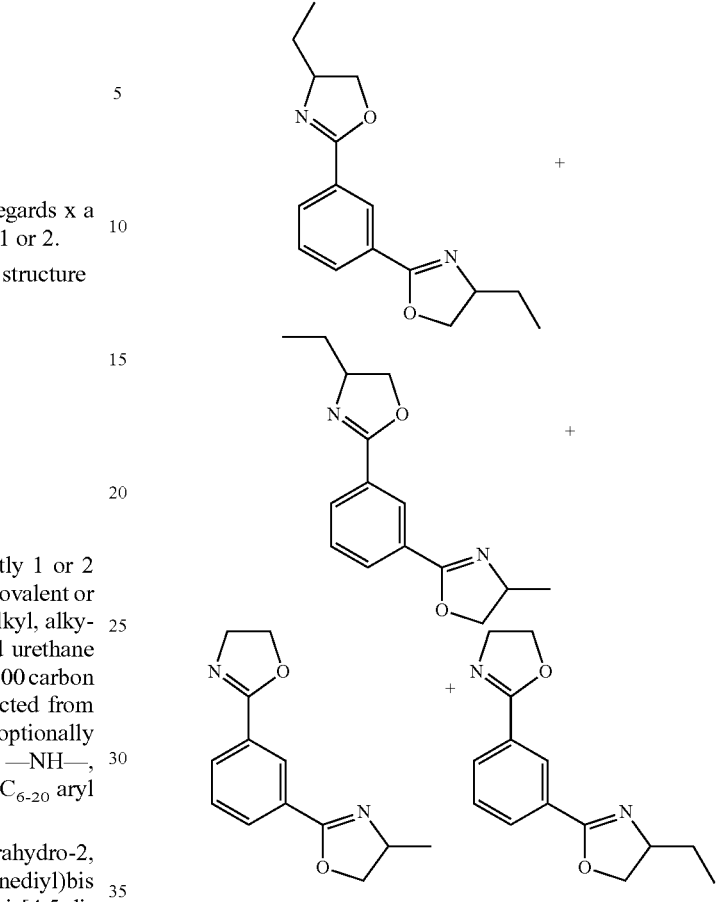

In general, a large number of polyepoxides having at least about two 1,2-epoxy groups per molecule are suitable for use herein. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis (4-hydroxyphenyl)-methane), bisphenol S, biphenol, bis(4-hydroxyphenyl)-1,1-isobutane, 4,4'-dihydroxybenzophenone, bis(4-hydroxyphenyl)-1,1-ethane, and 1,5-hydroxy-naphthalene. Other suitable polyphenols as the basis for the polyglycidyl ethers are the known condensation products of phenol and formaldehyde or acetaldehyde of the novolak resin-type.

Other polyepoxides that are in principle suitable for use herein are the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Still other polyepoxides are polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

And still other epoxides are derived from the epoxidation products of olefinically-unsaturated cycloaliphatic compounds or from natural oils and fats.

Particularly desirable are liquid epoxy resins derived from the reaction of bisphenol A or bisphenol F and epichlorohydrin. The epoxy resins that are liquid at room temperature generally have epoxy equivalent weights of from 125 to about 480.

Typically, the thermosetting resin composition may contain from about 10 to about 90 percent by weight, such as from about 20 to about 40 percent by weight, of epoxy resin. Ordinarily, the thermosetting resin composition may contain from about 40 to about 70 percent by weight benzoxazine.

The composition may include as at least a portion of the epoxy component a reactive diluent such as a mono-epoxide (e.g., monoglycidyl ethers of alkyl- and alkenyl-substituted phenols).

In addition to epoxy, episulfide is desirable as well, whether they are full or partial episulfides, provided that they are in the solid state. Episulfides may be commercially available or readily prepared from the corresponding epoxy through known synthetic methods.

The resin component may also include one or more of cyanate ester, maleimide, nadimide, itaconimide, phenolic and/or thiophenolic.

The resin component should be present in the thermosetting resin composition in an amount in the range of about 5 to about 60 percent by weight, such as about 10 to about 50 percent by weight, desirably about 15 to about 35 percent by weight, based on the total weight of the composition.

In one version, the thermosetting resin composition may also include a toughener. One such toughener is an acrylonitrile-butadiene co-polymer having secondary amine terminal groups. Other tougheners may include poly(propylene)oxide; polyether sulfone, such as PES 5003P, available commercially from Sumitomo Chemical Company, Japan; carboxy-terminated acrylonitrile butadienes; hydroxy-terminated acrylonitrile butadienes; core shell polymers; and BLENDEX 338, SILTEM STM 1500 and ULTEM 2000, which are available commercially from General Electric Company. ULTEM 2000 (CAS Reg. No. 61128-46-9) is a polyetherimide having a molecular weight ("Mw") of about 30,000±10,000. Those available commercially from Zeon Chemicals under the tradename NIPOL are also desirable. Of the NIPOL branded rubbers, acrylonitrile polybutadiene rubbers are particularly desirable.

When used, the toughener component should be present in the thermosetting resin component in an amount in the range of about 1 to about 90 percent by weight, such as about 10 to about 70 percent by weight, desirably about 15 to about 30 percent by weight, based on the total weight of the composition.

The curing agent may be selected from nitrogen-containing compounds such as amine compounds, amide compounds, imidazole compounds, guanidine compounds, urea compounds and derivatives and combinations thereof.

For instance, the amine compounds may be selected from, aliphatic polyamines, aromatic polyamines, alicyclic polyamines and combinations thereof.

The amine compounds may be selected from diethylenetriamine, triethylenetetramine, diethylaminopropylamine, xylenediamine, diaminodiphenylamine, isophoronediamine, menthenediamine and combinations thereof.

In addition, modified amine compounds, may be used, which include epoxy amine additives formed by the addition of an amine compound to an epoxy compound, for instance, novolac-type resin modified through reaction with aliphatic amines.

The imidazole compounds may be selected from imidazole, isoimidazole, alkyl-substituted imidazoles, and combinations thereof. More specifically, the imidazole compounds are selected from 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition products of an imidazole and trimellitic acid, 2-n-heptadecyl-4-methylimidazole, aryl-substituted imidazoles, phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, 2-p-methoxystyrylimidazole, and combinations thereof.

Modified imidazole compounds may be used as well, which include imidazole adducts formed by the addition of an imidazole compound to an epoxy compound.

Guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methyl-guanidine, dimethylguanidine, trimethylguanidine, tetra-methylguanidine, methylisobiguanidine, dimethylisobiguanidine, tetramethyliso-biguanidine, hexamethylisobiguanidine, heptamethylisobiguani-dine and cyanoguanidine (dicyandiamide). Representative guanamine derivatives include alkylated benzoguanamine resins, benzoguanamine resins and methoxymethylethoxy-methylbenzoguanamine.

In addition to or instead of the above-mentioned hardeners, catalytically-active substituted ureas may be used. For instance, p-chlorophenyl-N,N-dimethylurea (monuron), 3-phenyl-1,1-dimethylurea (fenuron) or 3,4-dichlorophenyl-N,N-dimethylurea (diuron) are representative examples.

Benzoxazine polymerization can also be initiated by cationic initiators, such as Lewis acids, and other known cationic initiators, such as metal halides; organometallic derivatives; metallophorphyrin compounds such as aluminum phthalocyanine chloride; methyl tosylate, methyl triflate, and triflic acid; and oxyhalides, and appropriate salts thereof.

The compositions may also include coreactants, curatives and/or catalysts for the benzoxazine component. Examples include Lewis acids, such as phenols and derivatives thereof, strong acids, such as alkylenic acids and cationic catalysts.

The amount of curing agent may depend upon a number of factors, including whether the curing agent acts as a catalyst or participates directly in crosslinking of the composition, the concentration of epoxy groups and other reactive groups in the composition, the desired curing rate and the like.

The curing agent should be present in an amount in the range of about 0.01 to about 40 percent by weight, such as about 0.5 to about 20 percent by weight, desirably about 1 to about 15 percent by weight, based on the total weight of the composition.

In building a large composite part where one or more temperature gradient(s) exist(s) at various locations within the part, low fluid pressure at cure can occur at the temperature lagging areas, resulting in poor wetting and poor composite properties. In addition, when low viscosity and high volatile thermosetting resins (such as some liquid benzoxazines) are used, resin volatilization during the process may create imperfection/micro-voids in the formed laminate. Using a catalyst to control volatilization may adversely affect mechanical properties and injection process window.

In addition, out of autoclave cure (with a vacuum bag pressure or 14.7 psi of pressure) may be realized using the invention so described herein.

In the performance hereof, better fiber consolidation and compaction; better resin and fiber adhesion leading to better mechanical performance, such as: impact toughness and interlaminar properties, improved thermal cycling and durability; reduced thermal stress; reduced cure shrinkage; and/or improved surfacing quality, may be observed.

EXAMPLES

A thermosetting resin composition for use as a matrix resin with fiber in a prepregging process having the noted components in the specified amounts is set forth in the table below.

| Component | Amt/Wt. % |
| --- | --- |
| Oxazine monomer | 19 |
| Oxazine polymer | 29 |
| Epoxy resin monomer | 10 |
| Epoxy resin polymer | 5 |
| Particulate toughener | 2 |
| Epoxy-terminated adduct* | 15 |
| Triflic acid salt | 1 |
| Silica | 5 |
| Thermoplastic toughener | 13 |
| Rubber toughener | 1 |

*epoxy terminated adduct of two different epoxy materials using bisphenol A as a linking portion.

Products formed by the so-described processes that use agents capable of expanding, show improved surface finished and decreased voiding. For instance, in the table below one can see the benefits of the inventive out of autoclave process as compared with an autoclave process and a conventional out of autoclave process.

| Physical properties | Cure type | | |
| --- | --- | --- | --- |
| | Autoclave | Out of Autoclave | Out of Autoclave/ Inventive Process |
| Surface finish | smooth | rough - deep channels | smooth |
| Density, g/cc | 1.55 | 1.14 | 1.57 |
| % Void, ASTM 3171-11 | 0.5 to 1 | >2.0 | 0.5 to 1 |

Reduced residual stress of the cured composite (e.g., cured prepreg or RTM) is also seen.

The cured prepreg is storage stable at room temperature.

The cured prepreg shows using c-scan substantially no detectable voids larger than approximately ⅛ inch.

The cured prepreg shows total void content of less than about 2% by volume determined by acid digestion using ASTM 3171-11. ASTM 3171-11, Standard Test Methods for Constituent Content of Composite Materials, determines the constituent content of composite by either of two approaches. Method I uses acid digestion or ignition to remove matrix resin while leaving the fiber reinforcement unaffected and provides for calculation of resin matrix and reinforcement content plus void volume percent. Method II uses physical dimensions of the cured prepreg sample, its density and the previously determined fiber areal weight, resin matrix density and fiber density to calculate constituent content but does nor provide for void volume. Since void volume is an important measure of the benefit of this application, additional detail of method I follows.

The procedure described in this test method requires cutting approximately 1 to 2 gram samples of the cured prepreg, drying to an equilibrium condition and determining the density using weight difference protocol. The sample is weighed, placed into beaker and immersed in 70% nitric acid heated to 80° C. until digestion of the matrix resin is complete. The beaker contents are then filtered through a tared sintered glass filter using vacuum and finally washed with 3 passes with distilled water and one pass with acetone. The filter is then dried in a 100° C. oven for up to 1 hour, cooled in a dessicator and weighed. Combustion may be used for fiber reinforcements, like glass or quartz, that do not degrade at high temperatures.

The test procedure follows the digestion method except the sample is placed in a preweighed crucible, exposed to a temperature in the 500° C. range until all resin matrix is removed, cooled to ambient and weighed. Determination of the void volume requires calculation of matrix resin volume percent and fiber reinforcement volume percent.

Fiber reinforcement volume percent uses the following formula:

$$V_r = (M_f/M_i) \times 100 \times \rho_c/\rho_r$$

where $M_f$=final mass of the specimen after digestion or combustion, g
$M_i$=initial mass of the specimen, g
$\rho_c$=density of the specimen, g/cm$^3$
$\rho_r$=density of the fiber reinforcement, g/cm$^3$
Matrix resin volume percent uses the following formula:

$$V_m = (M_i - M_f)/M_i \times \rho_c/\rho_m \times 100$$

where $\rho_m$=density of the matrix resin, g/cm$^3$
Void volume percent uses the following formula:

$$V_v = 100 - (V_r + V_m).$$

What is claimed is:

1. A process for curing a prepreg, comprising the steps of
   (A) Providing a prepreg comprising a thermosetting resin composition and fiber;
   (B) Placing the prepreg under reduced pressure relative to atmospheric pressure;
   (C) Exposing the prepreg under reduced pressure to a first elevated temperature relative to room temperature for a time sufficient to:
       remove about 1% by weight to about 3% by weight volatile materials in the prepreg, based on the total weight of the prepreg and
       increase viscosity of the prepreg to a range of about 1 to about 40,000 Poise;
   (D) Exposing the prepreg under reduced pressure relative to atmospheric pressure to a first subsequent elevated temperature relative to room temperature and greater than the first elevated temperature for a time sufficient to cure the prepreg; and
   (E) Exposing the cured prepreg to a second subsequent elevated temperature relative to room temperature that is less than any one or more of the first elevated temperature or the first subsequent or the second subsequent elevated temperatures with or without reduced pressure relative to atmospheric pressure.

2. The process of claim 1, wherein the first elevated temperature is in the range of about 120° F. to about 350° F.

3. The process of claim 1, wherein the any remaining volatile materials include water, residual solvents and/or monomeric volatile materials having a higher boiling point at atmospheric pressure relative to the materials having a low boiling point at atmospheric pressure.

4. The process of claim 1, wherein the thermosetting resin composition comprises one or more epoxies, episulfides, oxetanes, thioxetanes, maleimides, nadimides, itaconimides, oxazines, cyanate esters, and oxazolines.

5. The process of claim 1, wherein the fiber is a member selected from the group consisting of carbon, glass, aramid, boron, polyalkylene, quartz, polybenzimidazole, polyetheretherketone, polyphenylene sulfide, poly p-phenylene benzobisoxazole, poly p-phenylene benzobisthiazole, silicon carbide, phenolformaldehyde, phthalate, poly pyridobisimidazole and napthenoate.

6. The process of claim 5, wherein the fiber is glass and is a member selected from the group consisting of S glass, S2 glass, E glass, R glass, A glass, AR glass, C glass, D glass, ECR glass, glass filament, staple glass, T glass and zirconium oxide glass.

7. The process of claim 5, wherein the fiber is carbon and is made from polyacrylonitrile, pitch, rayon or acrylic.

8. The process of claim 1, wherein the fiber is carbon having been sized with a benzoxazine-containing sizing agent.

9. The process of claim 4, wherein the thermosetting resin composition is an oxazine and comprises one or more benzoxazines.

10. The process of claim 4, wherein the oxazine is a benzoxazine comprising one or more of

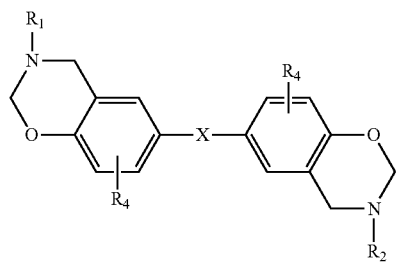

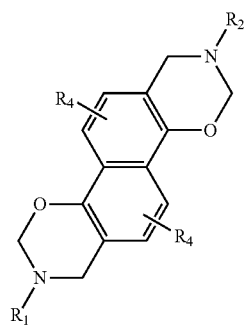

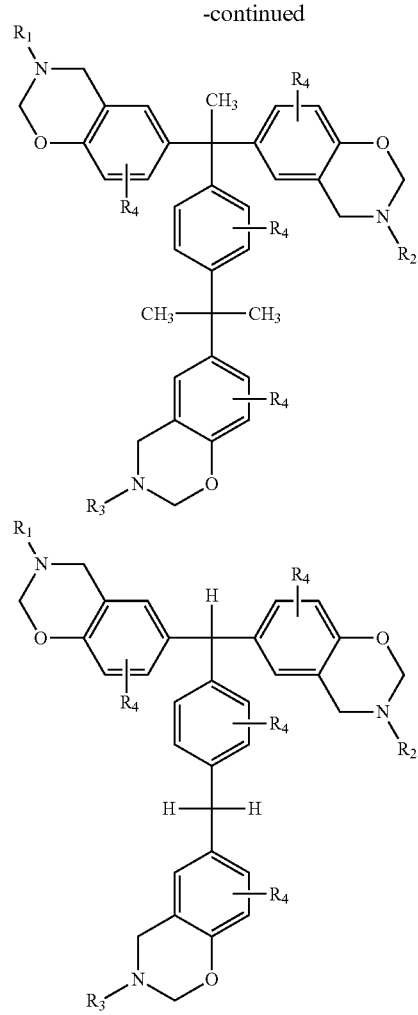

wherein X is selected from the group consisting of a direct bond, $CH_2$, $C(CH_3)_2$, $C=O$, $S$, $S=O$ and $O=S=O$, and $R_1$, $R_2$, $R_3$ and $R_4$ are the same or different and are selected from the group consisting of hydrogen, alkyl, alkenyl and aryl, and

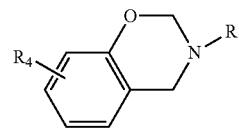

wherein R is alkyl or aryl and $R_4$ is selected from hydrogen, halogen, alkyl and alkenyl.

11. The process of claim 4, wherein the oxazine is a benzoxazine comprising one or more of

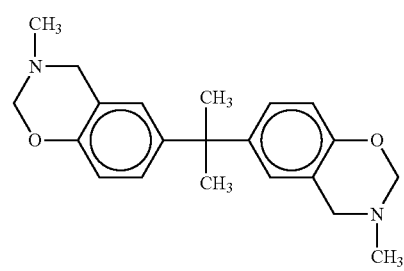

-continued

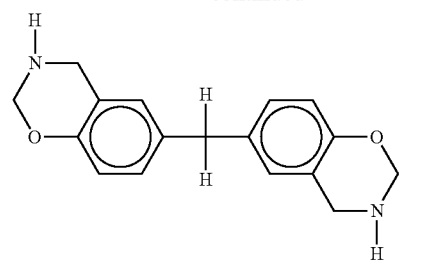
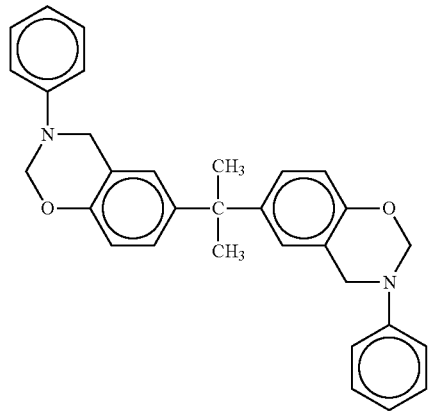
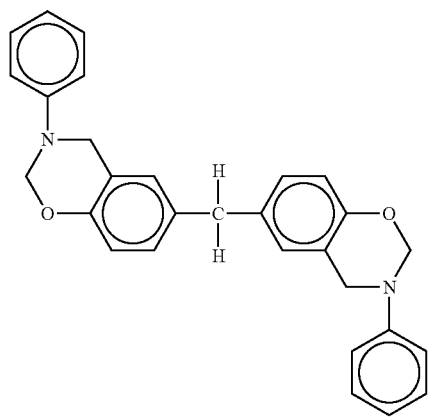
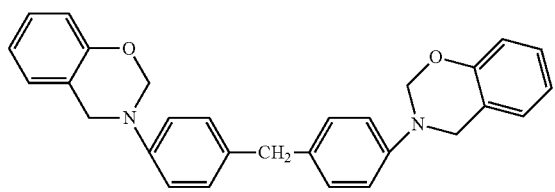
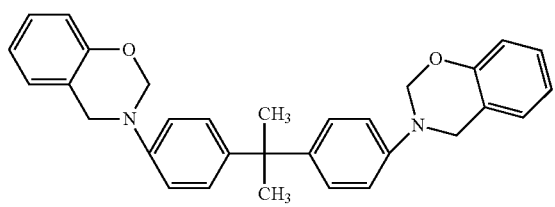

-continued

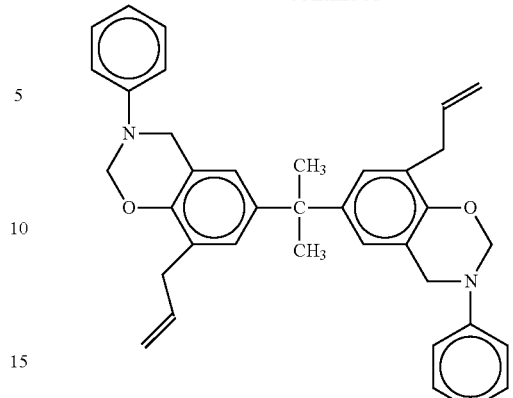
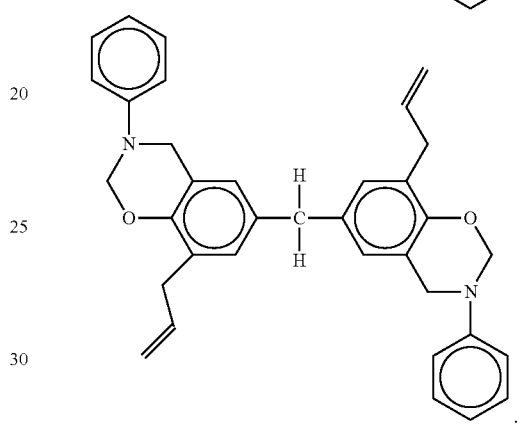

12. The process of claim 1, wherein the reduced pressure is greater than 686 mm Hg (13.3 psi).

13. The process of claim 1, wherein the first elevated temperature is about 200° F. and the time is about 2 hours.

14. The process of claim 1, wherein the first subsequent elevated temperature of step (D) is about 360° F. and the time is about 2 hours.

15. The process of claim 1, wherein the second subsequent elevated temperature of step (E) is about 90° F.

16. The process of claim 1, wherein the cured prepreg is storage stable at room temperature.

17. The process of claim 1, wherein the cured prepreg shows using c-scan substantially no detectable voids larger than approximately ⅛ inch.

18. The process of claim 1, wherein the cured prepreg shows total void content of less than about 1 to 2% by volume determined by acid digestion using ASTM 3171-11.

19. The process of claim 1, wherein after step (C) but before step (D) exposing the prepreg under reduced pressure to a second elevated temperature relative to room temperature, said second elevated temperature being greater than the first elevated temperature, for a time sufficient to remove remaining volatile materials in the prepreg.

20. The process of claim 19, wherein the second elevated temperature is about 290° F. and the time is about 3 hours.

\* \* \* \* \*